United States Patent
Akihama et al.

(10) Patent No.: US 10,759,930 B2
(45) Date of Patent: Sep. 1, 2020

(54) MOLDING MATERIAL MIXTURE AND METHOD FOR PRODUCING THE SAME

(71) Applicants: TOYOTA SHATAI KABUSHIKI KAISHA, Kariya-shi, Aichi (JP); KURASHIKI BOSEKI KABUSHIKI KAISHA, Kurashiki-shi, Okayama (JP)

(72) Inventors: Asuka Akihama, Aichi (JP); Minoru Sugiyama, Osaka (JP)

(73) Assignees: TOYOTA SHATAI KABUSHIKI KAISHA, Aichi (JP); KURASHIKI BOSEKI KABUSHIKI KAISHA, Okayama (JP)

(*) Notice: Subject to any disclaimer, the term of this patent is extended or adjusted under 35 U.S.C. 154(b) by 207 days.

(21) Appl. No.: 15/657,970

(22) Filed: Jul. 24, 2017

(65) Prior Publication Data
US 2018/0022908 A1    Jan. 25, 2018

(30) Foreign Application Priority Data
Jul. 25, 2016    (JP) ................................ 2016-145343

(51) Int. Cl.
C08L 23/12    (2006.01)
B22C 3/00    (2006.01)
(Continued)

(52) U.S. Cl.
CPC ............... *C08L 23/12* (2013.01); *B22C 1/14* (2013.01); *B22C 3/00* (2013.01); *C08F 251/02* (2013.01); *C08L 2205/16* (2013.01)

(58) Field of Classification Search
CPC ........ C08L 23/12; C08L 2205/16; B22C 3/00; B22C 1/14; C08F 251/02
See application file for complete search history.

(56) References Cited

U.S. PATENT DOCUMENTS

| | | |
|---|---|---|
| 2016/0002461 A1 | 1/2016 | Tsujii et al. |
| 2016/0133902 A1 | 5/2016 | Nakamura et al. |
| 2016/0263554 A1* | 9/2016 | Grubbs ................. B01J 20/265 |

FOREIGN PATENT DOCUMENTS

| | | |
|---|---|---|
| EP | 2 196 478 | 6/2010 |
| JP | 2009-067817 | 4/2009 |

(Continued)

OTHER PUBLICATIONS

Eyholzer, "Dried nonofibrillated cellulose", Doctoral Thesis, Feb. 1, 2011, 206 pages, XP055048720 http://pure.ltu.se/portal/files/32537168/Christian_Eyholzer.Komplett.pdf (retrieved on Jan. 7, 2013).

(Continued)

*Primary Examiner* — Jessica M Roswell
(74) *Attorney, Agent, or Firm* — Hamre, Schumann, Mueller & Larson, P.C.

(57) ABSTRACT

A molding material mixture contains cellulose nanofibers (CNFs) and at least one base material selected from the group consisting of a resin and fibers. A hydrophobic polymer is chemically bonded to at least some of the —OH groups of the cellulose nanofibers. The base material and the cellulose nanofibers are ground or pelletized. A method for producing the molding material mixture includes the following: a pre-irradiation step of applying an aqueous dispersion of CNFs to a base material sheet or immersing a base material sheet in the CNF aqueous dispersion, irradiating the base material sheet with an electron beam, and bringing the base material sheet into contact with an aqueous solution or an aqueous dispersion containing a hydrophobic monomer so that the hydrophobic monomer is graft-polymerized onto the CNFs, or a simultaneous irradiation step of mixing an aqueous dispersion of CNFs with a hydrophobic monomer to form a solution, applying the mixed solution to a base material sheet or immersing a base material sheet in the mixed solution, and irradiating the base material sheet with (Continued)

an electron beam so that the hydrophobic monomer is graft-polymerized onto the CNFs; a drying step; and a grinding or pelletizing step. The present invention provides a molding material mixture that contains cellulose nanofibers and at least one base material selected from the group consisting of a resin and fibers, and that can be handled as a ground product or pellets, and also provides a method for producing the molding material mixture.

10 Claims, 3 Drawing Sheets

(51) Int. Cl.
*B22C 1/14* (2006.01)
*C08F 251/02* (2006.01)

(56) References Cited

FOREIGN PATENT DOCUMENTS

| JP | 2009-144262 | 7/2009 |
| JP | 2009-256832 | 11/2009 |
| JP | 2010-216021 | 9/2010 |
| JP | 2013-234283 | 11/2013 |
| JP | 2014-162880 | 9/2014 |
| JP | 2014-234472 | 12/2014 |

OTHER PUBLICATIONS

Office Action issued in corresponding Japanese Patent Application No. 2016-145343, dated Nov. 28, 2019, 3 pages.
Office Action issued in corresponding Japanese Patent Application No. 2016-145343, dated Mar. 10, 2020, 5 pages.

\* cited by examiner

MOLDING MATERIAL MIXTURE AND METHOD FOR PRODUCING THE SAME

BACKGROUND OF THE INVENTION

1. Field of the Invention

The present invention relates to a molding material mixture containing cellulose nanofibers to which a hydrophobic polymer is bonded, and a resin or fibers. The present invention also relates to a method for producing the molding material mixture.

2. Description of Related Art

Cellulose nanofibers are conventionally known and can be produced in the following manner. A cellulose material is dispersed in water or the like, and then the dispersion is subjected to high shear forces so that the cellulose fibers are fibrillated. The high shear forces may be applied by, e.g., a bead mill, a blender-type disperser, a high-speed rotating homogenizer, a high-pressure homogenizer, a high-pressure injection treatment, or an ultrasonic disperser. For example, Patent Document 1 proposes to produce cellulose nanofibers using a material containing lignin. Patent Document 2 proposes to produce cellulose nanofibers by treating cellulose in the form of powder particles with a dibasic acid anhydride, dispersing the cellulose in the form of powder particles into a plasticizer, and melt-kneading the dispersion and polyolefin. Patent Document 3 proposes to produce cellulose nanofibers in water.

PRIOR ART DOCUMENTS

Patent Documents

Patent Document 1: JP 2010-216021
Patent Document 2: JP 2014-234472
Patent Document 3: JP 2009-256832

SUMMARY OF THE INVENTION

The cellulose nanofibers produced by the above conventional technologies are dispersed in a solvent, typically in water, to form a dilute aqueous dispersion of about 5% by mass when they are stored, transported, and used. This is because the cellulose nanofibers have a molecular structure including many hydroxyl groups (—OH groups), and also have a small fiber diameter. Therefore, once the cellulose nanofibers are dried, they are aggregated together by hydrogen bonds between the hydroxyl groups, and cannot be restored to their original state. These are problems associated with the conventional technologies.

In order to solve the conventional problems, it is an object of the present invention to provide a molding material mixture that contains cellulose nanofibers and at least one base material selected from the group consisting of a resin and fibers, and that can be handled as a ground product or pellets, and also to provide a method for producing the molding material mixture.

A molding material mixture of the present invention contains cellulose nanofibers and at least one base material selected from the group consisting of a resin and fibers. A hydrophobic polymer is chemically bonded to at least some of the —OH groups of the cellulose nanofibers. The base material and the cellulose nanofibers are ground or pelletized.

A method for producing a molding material mixture of the present invention includes the following: a pre-irradiation step of applying a solvent dispersion of cellulose nanofibers to a base material sheet or immersing a base material sheet in the solvent dispersion of cellulose nanofibers, irradiating the base material sheet with an electron beam, and bringing the base material sheet into contact with a solution or a solvent dispersion containing a hydrophobic monomer so that the hydrophobic monomer is graft-polymerized onto the cellulose nanofibers, or a simultaneous irradiation step of mixing a solvent dispersion of cellulose nanofibers with a hydrophobic monomer to form a solution, applying the mixed solution to a base material sheet or immersing a base material sheet in the mixed solution, and irradiating the base material sheet with an electron beam so that the hydrophobic monomer is graft-polymerized onto the cellulose nanofibers; a step of drying the base material sheet containing a graft polymer; and a step of grinding or pelletizing the base material sheet including the graft polymer.

In the molding material mixture of the present invention, the hydrophobic polymer blocks at least some of the —OH groups of the cellulose nanofibers, and thus prevents the hydrogen bonds between the cellulose fibers. Therefore, the molding material mixture is stable in the form of a ground product or pellets. In other words, the molding material mixture is stable in the form of a ground product or pellets in a dry state. The molding material mixture has the advantage of being able to be used directly for resin molding, since it may be either a ground product or pellets containing cellulose nanofibers and at least one base material selected from the group consisting of a resin and fibers. Moreover, the molding material mixture can also be a ground product or pellets having a high affinity for a matrix resin by appropriately selecting the hydrophobic polymer and the base material. The production method of the present invention can produce the molding material mixture efficiently and reasonably.

DETAILED DESCRIPTION OF THE INVENTION

Figure 1:
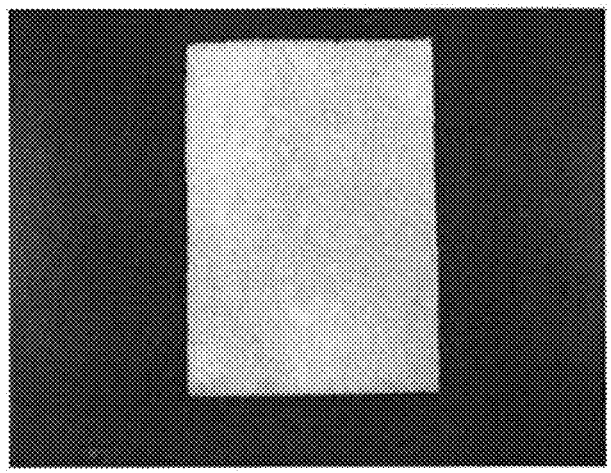
FIG. 1 is a photograph showing a state in which raw cellulose nanofibers dispersed in water are applied to a base material sheet (a nonwoven fabric sheet) in an example of the present invention.

Cellulose nanofibers may be preferably microfibrillated cellulose that is obtained by fibrillating the pulp of plants or the like at the nano level by a mechanical treatment such as a high-pressure homogenizer, a biaxial kneader, a crusher, or ultrasonic waves. The fiber diameter of the cellulose nanofibers is preferably, e.g., 4 to 100 nm, and more preferably 10 to 50 nm. The fiber length of the cellulose nanofibers is preferably, e.g., 1 to 10 m, and more preferably about 2 to 9 μm.

In the cellulose nanofibers of the present invention, a hydrophobic polymer is chemically bonded to at least some of the —OH groups. Monomers that are capable of forming the hydrophobic polymer are not particularly limited. Examples of the monomers include the following:

(1) unsaturated carboxylic acids and acid anhydrides thereof such as acrylic acid, methacrylic acid, fumaric acid, maleic acid, itaconic acid, maleic anhydride, and itaconic anhydride, and unsaturated carboxylic acid esters such as methyl acrylate, ethyl acylate, methyl methacrylate, ethyl methacrylate, monomethyl maleate, dimethyl maleate, and butyl benzyl maleate;

(2) vinyl esters such as vinyl acetate, vinyl propionate, and vinyl stearate, and vinyl ethers such as methyl vinyl ether, ethyl vinyl ether, octyl vinyl ether, and lauryl vinyl ether;

(3) vinylidenes such as vinylidene chloride;

(4) aromatic vinyl compounds such as styrene, α.methyl styrene, and divinylbenzene; and (5) unsaturated nitriles such as acrylonitrile, and cross-linkable monomers such as diallyl phthalate. Among them, the monomers having a good affinity for a base material can be selected.

The cellulose molecule is represented by the following general formula (Chemical Formula 1), where n is an integer of 1 or more (this applies to the other chemical formulas). The cellulose molecule has highly reactive hydroxyl groups at the C-2, C-3, and C-6 positions of the glucose residue. In the present invention, a hydrophobic polymer is covalently bonded to these sites. For example, polymethyl methacrylate is covalently bonded to the C-2 position of the glucose residue by graft polymerization. This example is represented by the following Chemical Formulas 2 and 3, where "Cell" indicates cellulose, and the —CH$_2$— group is a hydrocarbon radical in the cellulose chain, in which polymethyl methacrylate is formed by graft polymerization.

[Chemical Formula 1]

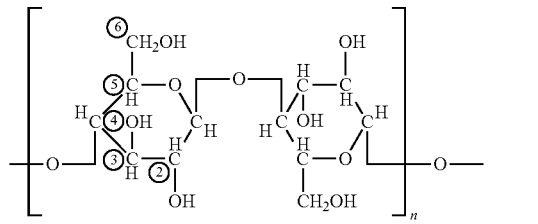

[Chemical Formula 2]

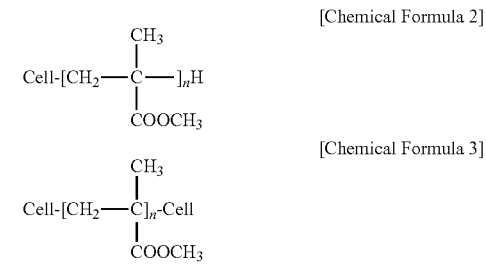

The ground product or pellets containing the cellulose nanofibers and the base material of the present invention are generally dry and solid, and can be supplied directly to a molding process. The ground product can also be dispersed in water, and such an aqueous dispersion of the ground product does not form a gel or a sol. Moreover, the aqueous dispersion returns to a solid ground product again when dried. On the other hand, the conventional cellulose nanofibers are available as an aqueous dispersion. If this aqueous dispersion is dried, the cellulose nanofibers are aggregated, and cannot be restored to their original aqueous dispersion.

In the present invention, the distance between the fibers in the cellulose nanofibers in a dry state is preferably 3 nm or more, further preferably 5 nm or more, and particularly preferably 10 to 25 nm. This can prevent the aggregation of the cellulose nanofibers. On the other hand, the distance between the fibers in the conventional cellulose nanofibers is about 1 nm, and thus the fibers are likely to be aggregated. Such a significant increase in the distance between the fibers from 1 nm to 20 nm will reduce the Van der Waals force between the fibers (i.e., the force of attraction between the fibers) to one two-millionth of that of the conventional cellulose nanofibers.

The ground product containing the cellulose nanofibers and the base material can have any size that is available for resin molding. For example, the cellulose nanofibers have a fiber diameter of about 50 nm. In general, fibers of a nonwoven fabric, which may be used as a base material, have a fiber diameter of about 4 μm and an arbitrary length. The fibers of the nonwoven fabric may have a length sufficient for resin molding, which is, e.g., 10 mm or less. It is preferable that the ground product containing the cellulose nanofibers and the base material does not become viscous when mixed with water. Due to this property, the handling of the ground product is improved, and the ground product can easily be kneaded with a resin or the like.

It is preferable that the hydrophobic polymer is formed by graft polymerization of a hydrophobic monomer including an unsaturated hydrocarbon bond. Any desired hydrophobic monomer can be bound to the cellulose nanofibers by graft polymerization. For example, a hydrophobic monomer having an organic group that has an affinity for a matrix resin can be bound to the cellulose nanofibers.

The proportion of the cellulose nanofibers is preferably 1 to 50% by weight and the proportion of the base material is preferably 50 to 99% by weight relative to 100% by weight of the entire mixture. If the proportions are within the above ranges, the base material can be used directly as a matrix resin, or the ground product or pellets can easily be kneaded with a matrix resin. The base material is preferably composed of a thermoplastic resin or thermoplastic synthetic fibers.

It is preferable that the base material is integrated with the cellulose nanofibers because the integrated body can be supplied directly to a molding process. In this case, the base material may be integrated with the cellulose nanofibers by applying an aqueous dispersion of the cellulose nanofibers to a base material sheet or immersing a base material sheet in the aqueous dispersion of the cellulose nanofibers, and graft-polymerizing a hydrophobic monomer onto the cellulose nanofibers so that part of the hydrophobic monomer is graft-polymerized onto the base material.

A method for producing the molding material mixture of the present invention includes the following:

A. (1) a pre-irradiation step of applying an aqueous dispersion of cellulose nanofibers to a base material sheet or immersing a base material sheet in the aqueous dispersion of cellulose nanofibers, irradiating the base material sheet with an electron beam, and bringing the base material sheet into contact with an aqueous solution or an aqueous dispersion containing a hydrophobic monomer so that the hydrophobic monomer is graft-polymerized onto the cellulose nanofibers, or (2) a simultaneous irradiation step of mixing an aqueous dispersion of cellulose nanofibers with a hydrophobic monomer to form a solution, applying the mixed solution to a base material sheet or immersing a base material sheet in the mixed solution, and irradiating the base material sheet with an electron beam so that the hydrophobic monomer is graft-polymerized onto the cellulose nanofibers;

B. a step of drying the base material sheet containing a graft polymer; and

C. a step of grinding or pelletizing the base material sheet containing the graft polymer.

It is preferable that the base material sheet is at least one selected from the group consisting of a thermoplastic resin sheet and a thermoplastic synthetic fiber sheet. If the base material sheet is a thermoplastic resin sheet or a thermoplastic synthetic fiber sheet, the ground product or pellets can be supplied directly to a molding process. Examples of the thermoplastic synthetic fiber sheet include a nonwoven fabric, a woven fabric, and a knitted fabric. In particular, the nonwoven fabric is preferred. The use of the nonwoven fabric can facilitate the absorption and retention of the solvent dispersion of the cellulose nanofibers and improve the handling properties. Water is generally used as a solvent to disperse the cellulose nanofibers.

The pre-irradiation step or the simultaneous irradiation step may perform the electron beam irradiation when the cellulose nanofibers are wet or after the cellulose nanofibers are dried. The electron beam irradiation generates free radicals in the cellulose nanofibers, and thus the hydrophobic monomer is bound to the cellulose nanofibers to form a polymer.

In the step A, a nonwoven fabric containing the aqueous dispersion of the cellulose nanofibers can have any thickness that allows an electron beam to pass through the nonwoven fabric. Although the ability of the nonwoven fabric to transmit the electron beam varies depending on its density and specific gravity, the thickness of the nonwoven fabric in a wet state is preferably 0.05 to 10 mm, and more preferably 0.1 to 5 mm. The thickness in this range makes it easy to irradiate the nonwoven fabric with an electron beam, and to bring the nonwoven fabric into contact with the aqueous solution or the aqueous dispersion containing a hydrophobic monomer.

It is preferable that the raw cellulose nanofibers are brought into contact with the aqueous solution or the aqueous dispersion containing a hydrophobic monomer by immersion or spraying. The immersion or spraying is highly efficient.

It is preferable that grinding is performed with, e.g., a grinder. Any grinder may be used. The ground product is screened as needed to separate a powder that preferably has an average particle size of 0.1 to 10 mm. For pelletization, square pellets of 1 to 10 mm per side are preferred. When the base material is a nonwoven fabric, the square pellets can be obtained by cutting the nonwoven fabric with a cutting tool.

In the present invention, examples of the hydrophobic monomer used for a hydrophobic treatment of the cellulose nanofibers include the following: acrylic acid and its salt such as methacrylic acid; acrylic ester and its salt such as methyl methacrylate; a nitrile-based monomer such as acrylonitrile; an amide-based monomer such as acrylamide; and a monomer containing a vinyl group. A solvent used with the hydrophobic monomer may be water, alcohol, or the like and is generally water.

The amount of irradiation of the electron beam is generally 1 to 200 kGy, preferably 5 to 100 kGy, and more preferably 10 to 50 kGy. It is preferable that the electron beam irradiation is performed in a nitrogen atmosphere. Because of the penetrability of the electron beam, only one side of the base material sheet that has been coated with or immersed in the raw cellulose nanofibers needs to be irradiated with the electron beam. The electron beam irradiation apparatus can be any commercially available apparatus, including, e.g., an area beam type electron beam irradiation apparatus such as EC250/15/180L (manufactured by IWASAKI ELECTRIC CO., LTD.), EC300/165/800 (manufactured by IWASAKI ELECTRIC CO., LTD.), or EPS300 (manufactured by NHV Corporation).

After the hydrophobic monomer is graft-polymerized by the electron beam irradiation, the base material sheet is squeezed by a mangle and dried. In this case, the drying may be performed by, e.g., a dryer at 100 to 120° C. for 0.5 to 3 hours.

EXAMPLES

The present invention will be described in more detail by way of examples. However, the present invention is not limited to the following examples.

<Rate of Increase in Weight>

The rate of increase in weight of cellulose nanofibers (CNFs) after EB processing with respect to a base material sheet (PP) is calculated by the following formula.

Rate of increase in weight (wt %)=[(PP weight+CNF weight after EB processing)−(PP weight)/(PP weight)]×100

The EB (electron beam) processing allows a hydrophobic monomer to be graft-polymerized onto the cellulose nanofibers by electron beam irradiation.

Example 1

As raw cellulose nanofibers (CNFs), "BiNFi-s" (trade name: 5 wt % CNF aqueous dispersion) manufactured by Sugino Machine Limited was used, and 0.5 g of CNFs were sampled and diluted with water to a concentration of 0.5 wt %. Then, 2 g of polypropylene (PP) nonwoven fabric sheet of 100 g/m² was padded with (or immersed in) the CNF aqueous dispersion. The PP nonwoven fabric sheet was produced by preparing card webs of PP fibers having a fineness of 2.2 decitex and a fiber length of 51 mm, and bonding the card webs together by needle punching. The PP nonwoven fabric sheet filled with the CNFs had a thickness of about 3 mm. This state is shown in FIG. 1.

Figure 2:
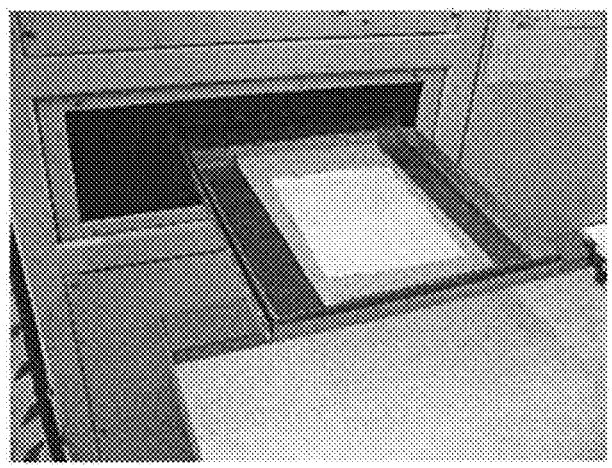
FIG. 2 is a photograph showing a state in which the base material sheet coated with the raw cellulose nanofibers is being inserted into an electron beam irradiation apparatus.

The PP nonwoven fabric sheet filled with the CNFs was placed in an electron beam irradiation apparatus, where it was irradiated with an electron beam under the conditions that the temperature was 25° C., the voltage was 250 kV, and the amount of irradiation was 40 kGy. The electron beam irradiation was performed in a nitrogen gas atmosphere. FIG. 2 shows a state in which the PP nonwoven fabric sheet filled with the CNFs is being inserted into the electron beam irradiation apparatus.

Figure 3:
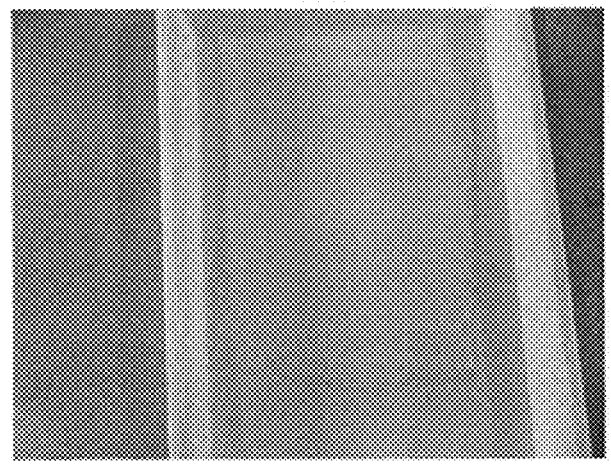
FIG. 3 is a photograph showing a state in which the raw cellulose nanofibers irradiated with an electron beam is immersed in an aqueous solution or an aqueous dispersion containing a hydrophobic monomer so that the hydrophobic monomer is graft-polymerized onto the raw cellulose nanofibers.

Then, the PP nonwoven fabric sheet along with the CNFs was taken out of the electron beam irradiation apparatus, and immediately immersed in 100 g of a treatment liquid containing 5 wt % methyl methacrylate (MMA) (hydrophobic monomer), 0.5 wt % polyoxyethylene sorbitan monolaurate (Tween 20) (surface active agent), and water. This PP nonwoven fabric sheet was allowed to react with the treatment liquid at a room temperature of 25° C. for 10 minutes. FIG. 3 shows a state in which the PP nonwoven fabric sheet containing the CNFs is immersed in an aqueous solution or an aqueous dispersion containing the hydrophobic monomer so that the hydrophobic monomer is graft-polymerized onto the cellulose nanofibers. As shown in FIG. 3, the rectangular sample was put in the liquid in a white container. Next, the resulting PP nonwoven fabric sheet was squeezed by a mangle and dried. Consequently, the PP nonwoven fabric sheet containing the CNFs had a thickness of about 1 mm, which then was cut with scissors into square pellets of 3 mm per side.

The hydrophobic monomer reacts with both the CNFs and the base material (i.e., PP fibers in this example). Therefore, the composition ratio of the CNFs to the base material cannot be precisely determined. However, assuming that the hydrophobic monomer did not react with the PP fibers, the proportions of the hydrophobic CNFs and the PP fibers were calculated by the following formulas based on the rate of increase in weight after the EB processing.

Proportion of hydrophobic CNFs (%)=(rate of increase in weight)×100/(rate of increase in weight+100)

Proportion of PP fibers (%)=100−(proportion of hydrophobic CNFs)

Figure 4:
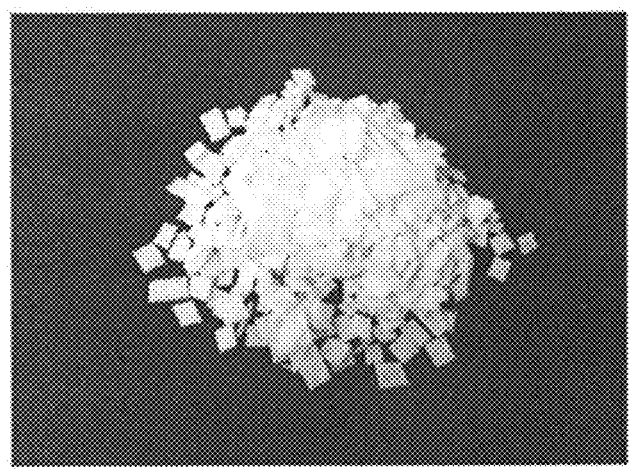
FIG. 4 is a photograph showing pellets obtained by pelletization of the base material sheet.

The pellets thus obtained were a mixture of 28% by weight of the hydrophobic CNFs and 72% by weight of the PP fibers. The hydrophobic CNFs and the PP fibers were integrated with each other. FIG. 4 is a photograph of the pellets. The pellets were supplied directly to a molding process. Tables 1 and 2 show the molding conditions and the results.

Figure 5:
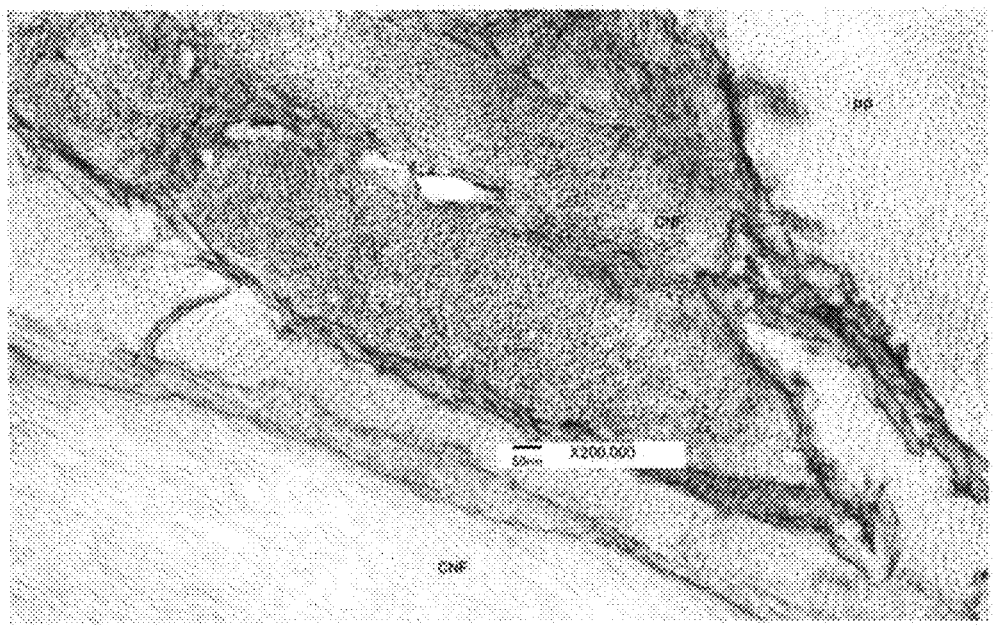
FIG. 5 is a transmission electron micrograph (TEM) showing the distance between the fibers in the raw cellulose nanofibers before the treatment.
Figure 6:
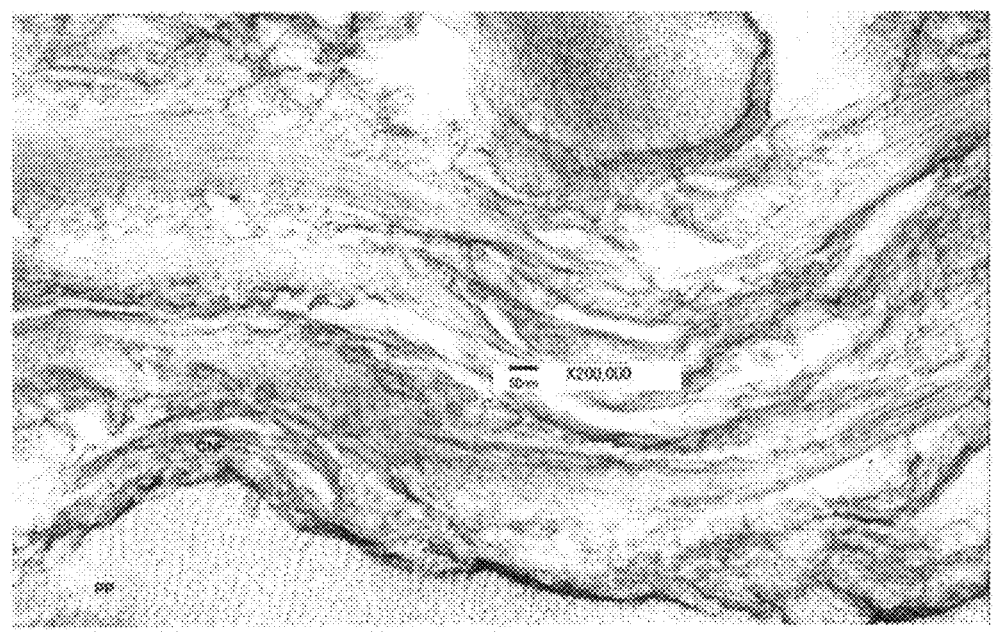
FIG. 6 is a transmission electron micrograph (TEM) showing the distance between the fibers in the cellulose nanofibers after the treatment in an example of the present invention.

FIG. 5 is a transmission electron micrograph (TEM) showing the distance between the fibers in the raw cellulose nanofibers before the treatment. FIG. 6 is a transmission electron micrograph (TEM) showing the distance between the fibers in the cellulose nanofibers after the treatment of the present invention. As can be seen from FIGS. 5 and 6, the treatment of the present invention increased the distance between the fibers from 1 nm (FIG. 5) to 20 nm (FIG. 6). Thus, the present invention can reduce the Van der Waals force between the fibers (i.e., the force of attraction between the fibers) to one two-millionth of that of the cellulose nanofibers before the treatment, which is a surprising finding.

Example 2

A CNF dispersion, methyl methacrylate (MMA), a surface active agent (Tween 20), and water were mixed to prepare an aqueous solution containing 2 wt % CNFs, 5 wt % MMA, and 0.5 wt % Tween 20. The PP nonwoven fabric sheet of Example 1 was padded with this mixed solution and irradiated with an electron beam. Then, the resulting PP nonwoven fabric sheet was squeezed by a mangle and dried. The PP nonwoven fabric sheet containing the CNFs was cut in the same manner as Example 1. Using the same calculation as Example 1, the pellets thus obtained were a mixture of 25% by weight of the hydrophobic CNFs and 75% by weight of the PP fibers. The hydrophobic CNFs and the PP fibers were integrated with each other. The pellets were supplied directly to a molding process. Tables 1 and 2 show the molding conditions and the results.

Examples 3 to 8, Comparative Examples 1 to 3

The experiments were performed in the same manner as Example 1 other than those shown in Tables 1 and 2. Tables 1 and 2 show the molding conditions and the results.

TABLE 1

| | Base material + CNF | | | | | | | |
|---|---|---|---|---|---|---|---|---|
| | CNF aqueous solution | Monomer | | EB condition | | Polymerization condition | | Weight increase rate |
| Experiment No. | (wt %) | Type | Concentration (wt %) | Irradiation method | Dose (kGy) | Temperature (° C.) | Time (min) | (wt %) |
| Ex. 1 | 0.5 | MMA – Tween20 | 5 | pre-irradiation | 40 | 25 | 30 | 38 |
| Ex. 2 | 2 | MMA – Tween20 | 5 | simultaneous irradiation | 40 | 50 | 60 | 34 |
| Ex. 3 | 0.5 | MMA | 1.5 | simultaneous irradiation | 40 | 50 | 60 | 8 |
| Ex. 4 | 0.5 | MMA | 1.5 | pre-irradiation | 40 | 25 | 30 | 9 |
| Ex. 5 | 2 | AAC | 5 | simultaneous irradiation | 40 | 50 | 60 | 40 |
| Ex. 6 | 0.5 | AAC | 5 | pre-irradiation | 40 | 25 | 30 | 15 |
| Ex. 7 | 2 | BA + Tween20 | 5 | simultaneous irradiation | 40 | 50 | 60 | 44 |
| Ex. 8 | 2 | IBOA + Tween20 | 5 | pre-irradiation | 40 | 50 | 60 | 33 |
| Comp. Ex. 1 | — | — | — | — | — | — | — | — |

TABLE 1-continued

| | Base material + CNF | | | | | | | |
|---|---|---|---|---|---|---|---|---|
| | CNF aqueous solution | | Monomer | | EB condition | | Polymerization condition | Weight increase rate |
| Experiment No. | (wt %) | Type | Concentration (wt %) | Irradiation method | Dose (kGy) | Temperature (° C.) | Time (min) | (wt %) |
| Comp. Ex. 2 | — | — | — | — | — | — | — | — |
| Comp. Ex. 3 | 2 | — | — | — | — | — | — | — |

(Note)
AAC: acrylic acid,
MMA: methyl methacrylate,
BA: butyl acrylate,
IBOA: isobornyl acrylate,
Tween 20: surface active agent

TABLE 2

| | Combination of matrix PP resin and pellets Evaluation | | | |
|---|---|---|---|---|
| Experiment No. | Additive rate (wt %) | Strength (MPa) | Elastic modulus (MPa) | Note (additives to matrix PP resin) |
| Ex. 1 | 0.81 | 39.4 | 1643 | Padding the PP base material with CNFs, followed by a grafting process. |
| Ex. 2 | 1.39 | 38.8 | 1645 | Padding the PP base material with CNFs, followed by a grafting process. |
| EX. 3 | 1.07 | 39.1 | 1538 | Padding the PP base material with CNFs, followed by a grafting process. |
| Ex. 4 | 1.08 | 39.6 | 1636 | Padding the PP base material with CNFs, followed by a grafting process. |
| Ex. 5 | 1.09 | 38.5 | 1642 | Padding the PP base material with CNFs, followed by a grafting process. |
| Ex. 6 | 0.69 | 38.7 | 1550 | Padding the PP base material with CNFs, followed by a grafting process. |
| Ex. 7 | 0.89 | 39.2 | 1676 | Padding the PP base material with CNFs, followed by a grafting process. |
| Ex. 8 | 0.86 | 39.0 | 1683 | Padding the PP base material with CNFs, followed by a grafting process. |
| Comp. Ex. 1 | 0 | 38.2 | 1325 | (No additives) |
| Comp. Ex. 2 | 0.41 | 38.4 | 1330 | Using only the PP base material. |
| Comp. Ex. 3 | 0.85 | 38.0 | 1292 | Padding the PP base material with untreated CNFs. |

(Note)
The additive rate indicates the rate at which the pellets made from the PP base material after the grafting process were added to the matrix PP resin.

As shown in Tables 1 and 2, the matrix PP resins in Examples 1 to 8 contained the pellets made from the PP base material after the grafting process, and thus had higher strength and elastic modulus than those in Comparative Examples 1 to 3. In particular, the elastic modulus was significantly higher in Examples 1 to 8.

INDUSTRIAL APPLICABILITY

The powder containing the cellulose nanofibers and the resin of the present invention is useful for a resin reinforcing material, an additive for various coating materials, or the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:
1. A molding material mixture comprising:
   cellulose nanofibers; and
   at least one base material selected from the group consisting of a resin and fibers,
   wherein the cellulose nanofibers are obtained by microfibrillation of pulp of plants, and have a fiber diameter of 4 to 100 nm and a fiber length of 1 to 10 μm,
   a hydrophobic polymer is chemically bonded to at least some of —OH groups of the cellulose nanofibers,
   a distance between fibers in the cellulose nanofibers in a dry state is 3 nm or more, and
   the base material and the cellulose nanofibers are integrated with each other and ground or pelletized.

2. The molding material mixture according to claim 1, wherein the molding material mixture does not become viscous when mixed with water.

3. The molding material mixture according to claim 1, wherein the hydrophobic polymer is formed by graft polymerization of a hydrophobic monomer including an unsaturated hydrocarbon radical.

4. The molding material mixture according to claim 1, wherein a proportion of the cellulose nanofibers is 1 to 50% by weight and a proportion of the base material is 50 to 99% by weight relative to 100% by weight of the entire molding material mixture.

5. A method for producing a molding material mixture comprising cellulose nanofibers and at least one base material selected from the group consisting of a resin and fibers, the method comprising:

(a1) pre-irradiation comprising:
applying a solvent dispersion of cellulose nanofibers to a base material sheet or immersing the base material sheet in the solvent dispersion of cellulose nanofibers;
irradiating the base material sheet with an electron beam; and
bringing the base material sheet into contact with a solution or a solvent dispersion containing a hydrophobic monomer so that the hydrophobic monomer is graft-polymerized onto the cellulose nanofibers to form a graft-polymer, or (a2) simultaneous irradiation comprising:
mixing the solvent dispersion of cellulose nanofibers with the hydrophobic monomer to form a solution, applying the mixed solution to the base material sheet, or immersing the base material sheet in the mixed solution; and
irradiating the base material sheet with the electron beam so that the hydrophobic monomer is graft-polymerized onto the cellulose nanofibers to form the graft-polymer;

(b) drying the base material sheet containing the graft polymer; and (c) grinding or pelletizing the base material sheet containing the graft polymer, wherein the cellulose nanofibers are obtained by microfibrillation of pulp of plants, and have a fiber diameter of 4 to 100 nm and a fiber length of 1 to 10 μm, a hydrophobic polymer is chemically bonded to at least some of —OH groups of the cellulose nanofibers, a distance between fibers in the cellulose nanofibers in a dry state is 3 nm or more, and the base material and the cellulose nanofibers used for grinding or pelletizing are integrated with each other.

6. The method for producing the molding material mixture according to claim 5, wherein the base material sheet is at least one selected from the group consisting of a thermoplastic resin sheet and a thermoplastic synthetic fiber sheet.

7. The method for producing the molding material mixture according to claim 6, wherein the thermoplastic synthetic fiber sheet is a nonwoven fabric.

8. The method for producing the molding material mixture according to claim 5, wherein the pre-irradiation or the simultaneous irradiation performs the electron beam irradiation when the cellulose nanofibers are wet or after the cellulose nanofibers are dried.

9. The molding material mixture according to claim 1, wherein the base material is at least one selected from the group consisting of a thermoplastic resin sheet and a thermoplastic synthetic fiber sheet.

10. The molding material mixture according to claim 9, wherein the thermoplastic synthetic fiber sheet is a nonwoven fabric.

* * * * *